US007962472B2

(12) United States Patent
Erickson et al.

(10) Patent No.: US 7,962,472 B2
(45) Date of Patent: Jun. 14, 2011

(54) SELF-OPTIMIZING ALGORITHM FOR REAL-TIME PROBLEM RESOLUTION USING HISTORICAL DATA

(75) Inventors: Steven C. Erickson, Rochester, MN (US); Ivory Wellman Knipfer, Rochester, MN (US); Jeffrey George Komatsu, Kasson, MN (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 12/240,442

(22) Filed: Sep. 29, 2008

(65) Prior Publication Data

US 2010/0083029 A1 Apr. 1, 2010

(51) Int. Cl.
G06F 7/00 (2006.01)
G06F 17/30 (2006.01)
(52) U.S. Cl. ......... 707/713; 707/751; 707/752; 707/758
(58) Field of Classification Search .................. 707/713, 707/728, 749–752, 758, 765, 769
See application file for complete search history.

(56) References Cited

U.S. PATENT DOCUMENTS

| 4,866,635 | A | * | 9/1989 | Kahn et al. | 706/46 |
| 5,210,704 | A | * | 5/1993 | Husseiny | 702/34 |
| 6,873,995 | B2 | * | 3/2005 | Laue et al. | 707/607 |
| 7,305,465 | B2 | | 12/2007 | Wing et al. | |
| 7,856,341 | B2 | * | 12/2010 | Carlson et al. | 702/185 |
| 2004/0168164 | A1 | | 8/2004 | Shevchenko | |
| 2005/0015217 | A1 | * | 1/2005 | Weidl et al. | 702/185 |
| 2005/0204215 | A1 | | 9/2005 | Tukiainen | |

* cited by examiner

Primary Examiner — Don Wong
Assistant Examiner — Merilyn P Nguyen
(74) Attorney, Agent, or Firm — Yee & Associates, P.C.; Steven L. Bennett (57) ABSTRACT

A self-optimizing algorithm for real-time problem resolution using historical data. Upon receiving failure symptom characteristics for a product or process failure, the algorithm queries historical failure data to locate historical failure symptoms and corrective actions matching the failure symptom characteristics. If a total number of the historical corrective actions identified meets a minimum match threshold, the algorithm selectively prunes a failure symptom characteristic having the lowest priority level to form an adjusted search query. The algorithm may repeat the querying, identifying, and determining steps using the adjusted search query until the total number of historical corrective actions identified meets the minimum match threshold. Once the threshold is met, the algorithm sorts the historical corrective actions to form a list of recommended corrective actions for the failure symptom characteristics and provides the list of recommended corrective actions to an end user.

20 Claims, 7 Drawing Sheets

| CHARACTERISTIC 1 (PRODUCT ERROR CODE) | CHARACTERISTIC 2 (PRODUCT ERROR SUB-CODE) | CHARACTERISTIC 3 (FAILING TEST PROGRAM ERROR CODE) | CHARACTERISTIC 4 (FAILING TEST PROGRAM) | CHARACTERISTIC 5 (PRODUCT FAMILY) | CHARACTERISTIC 6 (PRODUCT MODEL) | UNIQUE FAILURE ID |
|---|---|---|---|---|---|---|
| B101001 | 0001A101 | IPLF | sysipl | SERVER | S100 | 00000001 |
|  |  | MTAP | chktape | SERVER | S100 | 00000002 |
| B101001 |  | IPLF | sysipl | SERVER | S200 | 00000003 |

FIG. 6

| UNIQUE FAILURE ID | ACTION CODE | ACTION SUB CODE | REPLACED PN | REPLACED PART LOCATION | FIXED PROBLEM? | COMMENT |
|---|---|---|---|---|---|---|
| 00000001 | REPL_PART | DASD | 03N1234 | SLOT 2 | Y | REPLACED DEFECTIVE DASD |
| 00000002 | INSRT_TAPE | 4MM |  |  | Y | INSERTED MISSING TEST TAPE |
| 00000003 | REPL_PART | ADAPTER | 04J0234 | PCI 2 | Y | REPLACED SCSI CONTROLLER |
| 00000004 | CHK_CABLE | POWER |  |  | N | CHECKED POWER CABLE |

FIG. 7

CHARACTERISTICS
CONTROL TABLE
800

| | SYMPTOM | PRIORITY OF CHARACTERISTIC (804) | REQUIRED CHARACTERISTIC? (806) |
|---|---|---|---|
| 808 | CHARACTERISTIC 1 (PRODUCT ERROR CODE) | 100 | Y |
| | CHARACTERISTIC 2 (PRODUCT ERROR SUB-CODE) | 70 | Y |
| | CHARACTERISTIC 5 (FAILING TEST PROGRAM ERROR CODE) | 80 | Y |
| | CHARACTERISTIC 4 (FAILING TEST PROGRAM) | 40 | Y |
| | CHARACTERISTIC 6 (PRODUCT FAMILY) | 30 | N |
| 810 | CHARACTERISTIC 7 (PRODUCT MODEL) | 20 | N |

(802 = SYMPTOM column)

FIG. 8

MIN/MAX
CONTROL TABLE
1000

| PRODUCT (1002) | MINIMUM RECORDS REQUIRED (1004) | MAXIMUM RECORDS USED (MOST RECENT) (1006) |
|---|---|---|
| PRODUCT 1 (LOW VOLUME) — 1008 | 5 | 50 |
| PRODUCT 2 (HIGH VOLUME) — 1010 | 25 | 200 |

FIG. 10

CHARACTERISTICS
CONTROL TABLE
900

| SYMPTOM | PRIORITY OF CHARACTERISTIC FOR DEFECTIVE PART DETERMINATION | REQUIRED FOR PART DETERMINATION? | PRIORITY OF CHARACTERISTIC FOR NON-PART DETERMINATION | REQUIRED FOR PART DETERMINATION? |
|---|---|---|---|---|
| CHARACTERISTIC 1 (PRODUCT ERROR CODE) | 100 | | 30 | |
| CHARACTERISTIC 2 (PRODUCT ERROR SUB-CODE) | 70 | | 30 | |
| CHARACTERISTIC 5 (FAILING TEST PROGRAM ERROR CODE) | 80 | Y | 100 | |
| CHARACTERISTIC 4 (FAILING TEST PROGRAM) | 20 | Y | 80 | Y |
| CHARACTERISTIC 6 (PRODUCT FAMILY) | 30 | | 10 | Y |
| CHARACTERISTIC 7 (PRODUCT MODEL) | 40 | | 20 | |

FIG. 9

SELF-OPTIMIZING ALGORITHM FOR REAL-TIME PROBLEM RESOLUTION USING HISTORICAL DATA

BACKGROUND OF THE INVENTION

1. Field of the Invention

The present invention relates generally to an improved data processing system, and in particular to a computer implemented method, data processing system, and computer program product for providing a self-optimizing algorithm for real-time problem resolution using historical data.

2. Description of the Related Art

In a manufacturing environment, a requisition for goods or services, described in terms of exchange of those goods or services for agreed compensation in a contractual form, is called an order. Customers place orders for products that must be manufactured once the order has been placed. For timely manufacturing and delivery of the ordered product, a significant amount of planning, preparation, and procurement procedures are involved in the production process. Accounting systems, planning systems, warehouse management systems, logistics systems, and numerous other systems, support the production planning process to ensure that the orders are capable of being fulfilled. These systems may determine whether orders can be fulfilled based on the buyer's account status, suppliers' inventory levels, manufacturer's own warehouse inventory, quantities on hand, assembly schedule availability, and tooling and personnel availability among other factors.

When an order is received from a customer, the manufacturing system breaks down the order into requisite materials. The term "material" used in the context of an order in this manner means the various components, supplies, accessories, and consumable items needed for making the ordered product. For example, for an order for a computer, the materials may include a specific motherboard, a processor of a certain specification, a chassis of certain dimensions, a power supply of certain wattage, and number of screws of a certain size to fasten the motherboard to the chassis. For each order, the manufacturing system generates one or more bills of materials (BOM), which is a listing of materials or parts needed to complete the order. A part is an individual component or device which exists prior to being assembled into another component or assembly.

When products that have a high degree of complexity are assembled, test processes are executed on these complex assemblies on a regular basis. These test processes are used to find product defects or process flow problems. Critical attributes of each problem encountered are captured and stored for use offline in a quality management system for failure analysis or to help direct future process improvements. Subsequent user actions taken to resolve the failures may also be captured and stored in offline processes. These attributes and resolution data elements are valuable in aiding the process of debugging product and process flow issues.

BRIEF SUMMARY OF THE INVENTION

The illustrative embodiments provide a self-optimizing algorithm for real-time problem resolution using historical data. Upon receiving failure symptom characteristics for a product or process failure, the algorithm queries historical failure data to locate historical failure symptoms and corrective actions matching the failure symptom characteristics. If a total number of the historical corrective actions identified meets a minimum match threshold, the algorithm selectively prunes a failure symptom characteristic having the lowest priority level to form an adjusted search query. The algorithm may repeat the querying, identifying, and determining steps using the adjusted search query until the total number of historical corrective actions identified meets the minimum match threshold. Once the threshold is met, the algorithm sorts the historical corrective actions to form a list of recommended corrective actions for the failure symptom characteristics and provides the list of recommended corrective actions to an end user.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
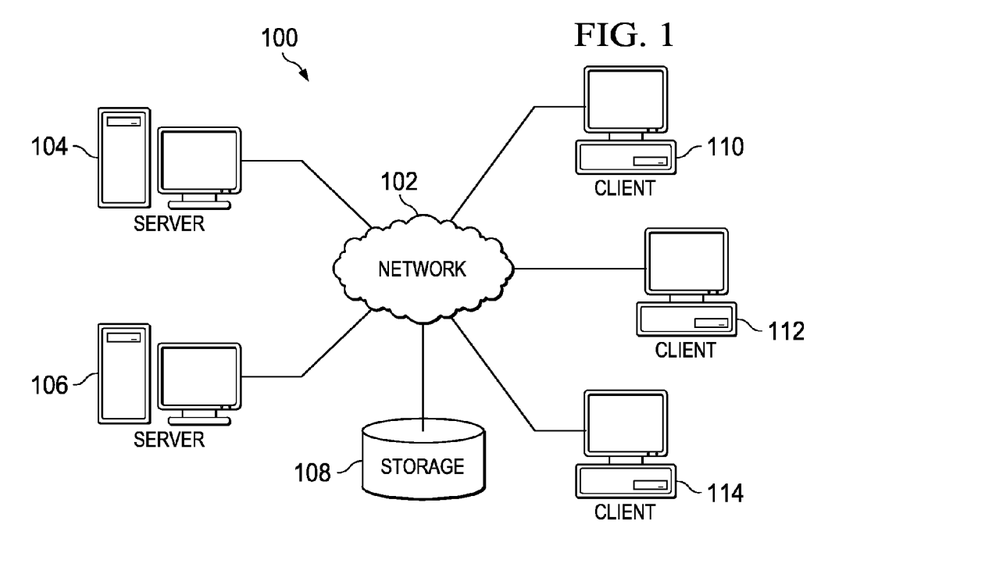
FIG. 1 depicts a pictorial representation of a distributed data processing system in which the illustrative embodiments may be implemented.
Figure 2:
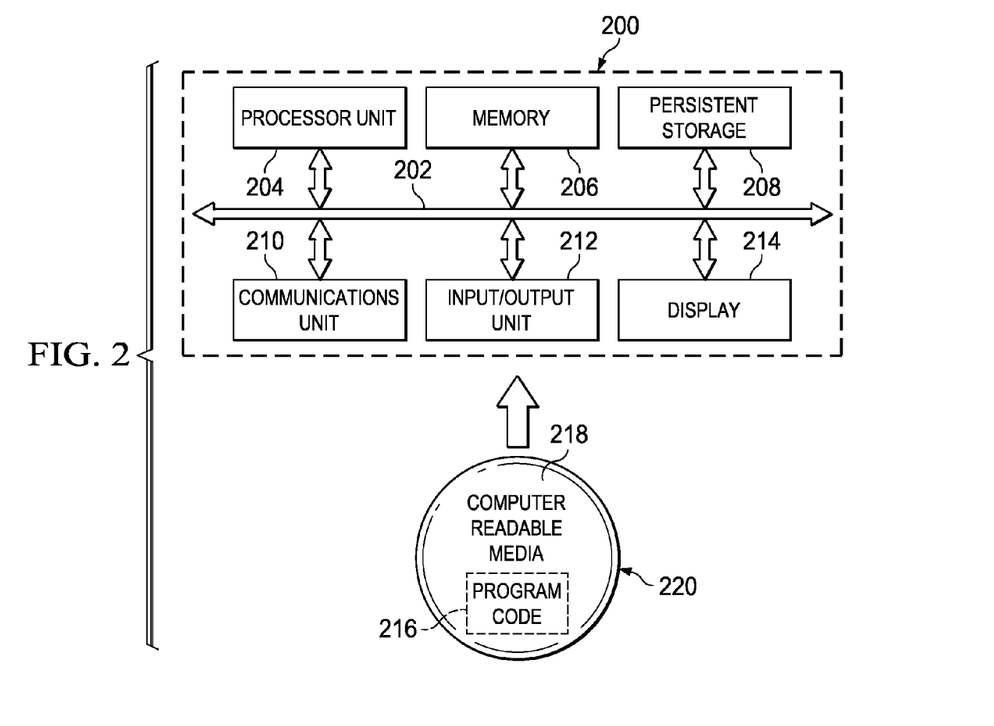
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As previously mentioned, product defects or process flow problems in complex assembly and test processes are found and resolved on a regular basis. Critical attributes or characteristics of each problem encountered are often stored for later use in a quality management system for failure analysis. These attributes may be used to assist in debugging the product or process problems.

In the debugging process, the failure symptoms of a problem being solved must be effectively tied to the actions that resolved the problem in the past. Traditionally, companies that collect problem resolution information only make this product failure and resolution information available for manual analysis or for very limited queries. Existing methods of handling and resolving such product failures consist of anticipating potential errors that may occur in the assembly and test processes, and suggesting fixes that may resolve these anticipated errors. Existing methods identify failure symptoms that are generally known isolated events, error codes, messages, etc., and provide a number of possible solutions based on the detected symptom. For example, a product that displays unique error codes or messages enables reference of the failure symptom in a table and the return of associated resolutions to the detected error.

A problem with existing methods of providing product resolution data is that in many cases, the existing methods only support a limited number of error characteristics and possible resolutions, thereby providing limited product resolution data to the users. In addition, for each error code detected, a complex procedure may be defined if the error code specifies multiple causes. For instance, the product resolution data provided to the user may comprise an instruction procedure to try fix 1, and if fix 1 does not solve the problem, try fix 2, and if fix 2 does not solve the problem, try fix 3, and so on. Furthermore, the failure symptoms and associated resolutions to the errors are created as a result of an extended quality assurance process. Thus, the product resolution data provided in the existing methods are static in nature. As a result, product resolution data that is identified at a processing plant in one physical location may not be known to other processing plants at other physical locations until the quality assurance process is performed at a later time. Thus, product resolution data identified at one site may be provided to other sites too late to assist in and minimize the product debugging processes at the other sites.

While existing methods allow for detecting and handling product and process errors, their dependence on a single failure symptom code to identify the problem with the product is insufficient for complex dynamic build-to-order products produced on a common manufacturing line. In addition, the existing methods rely only on data that is generated during the product development cycle and that remains static. The illustrative embodiments address the problems above by providing a mechanism that enables problem resolution data to be updated in real-time to include additional resolution data as the new data becomes available. In contrast with existing methods which use pre-defined specific error codes to identify a problem and possible resolutions, the problem resolution mechanism in the illustrative embodiments looks for patterns of attribute values for a detected product or process failure. The attribute value patterns are not required to be defined in advance. Consequently, the problem resolution mechanism allows more problem resolution information to be provided to an end user by locating attribute value patterns for a detected product or process failure in comparison with the limited amount of failure information generated when using specific error codes. The problem resolution mechanism provides the ability to model patterns of product and process failure characteristics and inserts a real-time self-optimizing algorithm into test and failure analysis processes. The self-optimizing algorithm automatically adjusts to current failure symptoms and identifies, in real-time, previous corrective actions taken for similar symptoms detected across processing facilities at other locations. The self-optimizing algorithm identifies corrective action recommendations based on historical failure data, and provides these corrective action recommendations to a user. Thus, known solutions to production issues may be provided to operators in real-time to improve debugging efforts.

The problem resolution mechanism of the illustrative embodiments allows failure symptom characteristics for specific products and processes to be defined and input by a user into a failure symptom table. Examples of product and process failure symptom characteristics may include, but are not limited to, System Reference Code (SRC) fail code (or other error codes), Test Step, Test Program, Date/Time, Product, Time to Fail, etc. The failure symptom characteristics in the table comprise "search fields" that are queried by the self-optimizing algorithm in real-time to identify a pattern of historical characteristics matching the currently detected failure symptoms. The algorithm examines the historical failure data and associated corrective action decisions that may be collected from all of a company's processing or manufacturing locations worldwide. As products may be sourced among different worldwide fulfillment centers, the algorithm ensures that all sites are acting on the latest failure resolution information available.

To identify a pattern of historical characteristics matching a currently detected failure symptom, the self-optimizing algorithm first starts a search of the historical production data using selection criteria that comprises all of the relevant characteristics in the detected failure symptom. The selection criteria are used to locate a significant number of matching failure symptoms, or "significant match" in the failure symptom table. A significant match is a statistically significant or user-defined percentage or number of historically similar failures. In one embodiment, significant matches are defined at the product level. If a significant match is found, the self-optimizing algorithm retrieves and provides the corrective actions associated with the failure symptoms in the significant match and provides the most common actions to the user as recommended corrective actions. The corrective actions provided to the user comprise a listed set of most common actions that solved the matching failure symptom characteristics. The list of corrective actions provided to a user (as well as the order of the actions) may automatically change in real-time as emerging problems and fixes occur.

The problem resolution mechanism of the illustrative embodiments also automatically prunes the selection criteria in the query until a significant number of historically similar failures are found. Thus, if no significant match for the product failure is found, the self-optimizing algorithm prunes (removes) the least weighted or prioritized characteristic from the set of failure characteristics and searches the production history again. This searching and pruning process continues until a significant match is found or an exhaustive search for historical failure matches has been completed.

The problem resolution mechanism of the illustrative embodiments provides several advantages over the existing problem resolution systems. The problem resolution mechanism provides a self-tuning problem resolution result based on historical failure data and associated corrective action decisions collected from all of an organization's processing facilities. Rather than having to wait for time-latent statistical process control (SPC) or quality assurance (QA) processes to be performed to determine that updates to the corrective action recommendations are needed, the problem resolution mechanism responds to new data in real-time and is capable of detecting and automatically adjusting to subtle shifts in failures and the associated corrective actions. The problem resolution mechanism may also improve debug cycle time (response time) and manufacturing capacity and throughput by providing appropriate corrective action recommendations for given failure symptoms. In addition, data may start accumulating from the point of early manufacturing involvement in the new product development process. When the product is released to the production manufacturing locations, there will already be a pool of knowledge from which to provide corrective action recommendations.

Figure 3:
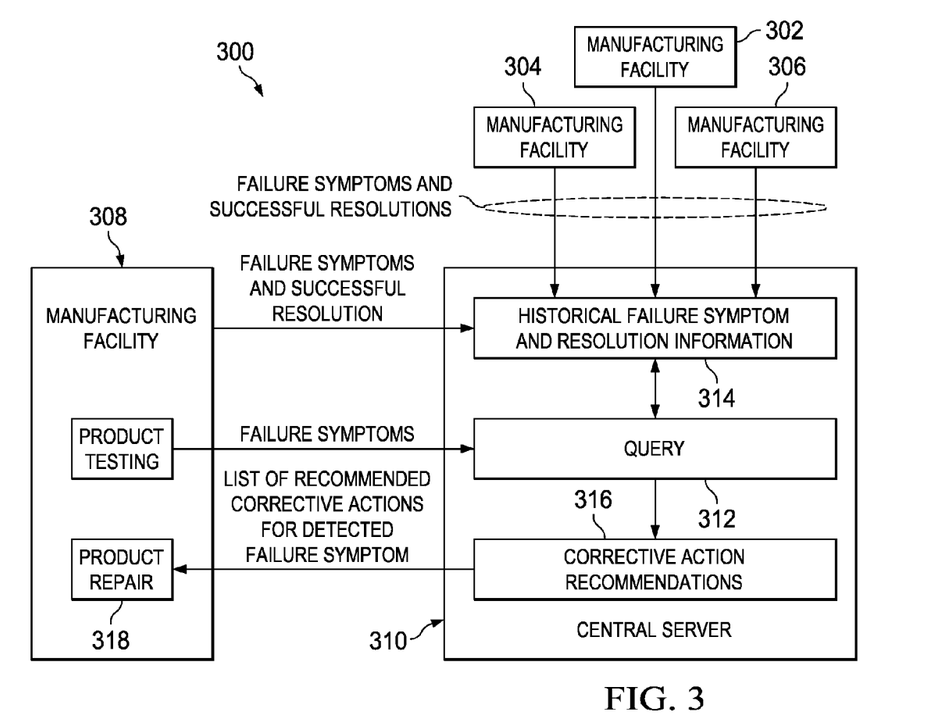
FIG. 3 is a diagram of an exemplary data processing system in which aspects of the illustrative embodiments may be implemented.

FIG. 3 is a diagram of an exemplary data processing system in which aspects of the illustrative embodiments may be implemented. In this illustrative example, data processing system 300 comprises a plurality of networked manufacturing facilities in which products are assembled and tested. Although the particular embodiments are described in terms of a manufacturing environment, data processing system 300 may comprise any networked environment in which product and process failures occur, are detected, and are resolved without departing from the spirit and the scope of the invention. For example, in another embodiment, data processing system 300 may comprise products distributed by a company. The products may send their failure attributes to the company, or the company may query and retrieve the failure attributes when a user reports a problem with the product. A help desk or other process collects the relevant historical data to build a database comprising the collected historical data and automates future failure resolution requests based on this collected data.

Data processing system 300 includes manufacturing facilities 302-308 and central server 310. Manufacturing facilities 302-308 are examples of client data processing systems, such as clients 110, 112, or 114 in FIG. 1. Central server 310 is an example of a server, such as server 104 in FIG. 1. When a production problem is resolved at a manufacturing facility, such as manufacturing facilities 302-306, the manufacturing facility provides the failure symptom information and the associated resolution fix to central server 310. Central server 310 stores the failure symptom and associated resolution information in a database to allow the resolution fix to be shared in real-time with another facility who has also encountered the failure. In one embodiment, infrastructure issues may be added to the database externally (e.g., manually). For example, known network or server issues may be directly provided to the operators to inform the operators of these ongoing issues and to prevent unnecessary repair efforts on these issues by the operators. The infrastructure issue information may be tied to specific failure symptoms in the database or provided to the operators as a general warning added to the result of the query.

When a problem is encountered by an operator at a manufacturing facility such as manufacturing facility 308, the failure symptoms are sent to central server 310. Central server 310 dynamically creates a query 312 that accesses historical failure symptoms 314 and associated resolution information (corrective actions) 316 stored at the central server in real-time to locate historical failure symptoms received from all other manufacturing facilities that match the current failure symptoms. A match may comprise a match of all of the failure symptoms or, in some cases, a match of at least a portion of the failure symptoms. A match may comprise a portion of the failure symptoms in cases where some fields are not populated in the historical database (i.e., if the corresponding attributes were not available at the time the failure occurred), as well as when data elements are missing from the current failure that triggered the failure analysis. The corrective actions 316 corresponding to the matching historical failure symptoms are provided to the operator at manufacturing facility 308. The operator performs one or more of the recommended corrective actions to resolve/repair the failure 318. The successful corrective action is logged back to the failure symptom and resolution information database in central server 310.

Figure 4:
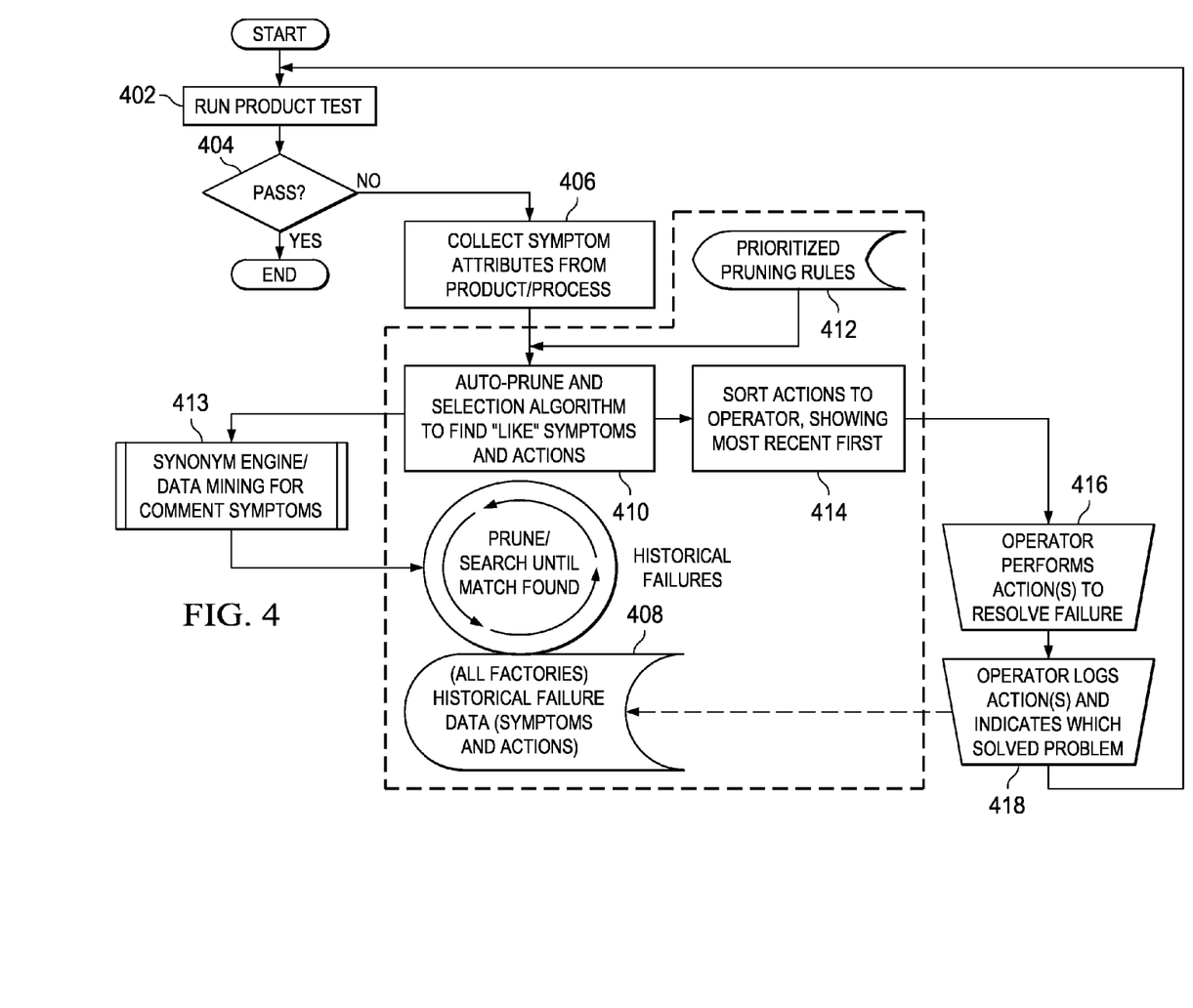
FIG. 4 is a high level process flow for real-time problem resolution using historical data in accordance with the illustrative embodiments.

FIG. 4 is a high level process flow for real-time problem resolution using historical data in accordance with the illustrative embodiments. The process described in FIG. 4 uses a real-time self-optimizing algorithm that automatically adjusts to current failure symptoms and identifies, in real-time, previous corrective actions taken for similar symptoms detected across other processing locations. The self-optimizing algorithm identifies corrective action recommendations based on historical failure data and provides these corrective action recommendations to a user.

The process begins when a product (and process) test is executed on a product being assembled at a processing facility, such as at manufacturing facility 308 in FIG. 3 (block 402). Once the product test has been run, a determination is made at the processing facility as to whether the product test is successful (block 404). If the test is successful ('yes' output of block 404), the process terminates thereafter.

However, if the test is not successful ('no' output of block 404), the processing facility passes information about the unsuccessful product test to a central server, such as central server 310 in FIG. 3. The central server collects the particular failure symptom characteristics and associated resolution actions from the processing facility for the particular product/process tested (block 406). The central server then initiates the self-optimizing algorithm (represented by blocks 408-414) for real-time problem resolution using historical data.

The self-optimizing algorithm searches historical failure data in block 408 using search criteria for the particular failure symptom to locate the same or similar failure symptoms and corresponding corrective actions encountered at the processing facility and to prune the failure symptom search criteria if needed (block 410). Historical failure data in block 408 comprises failure symptom characteristics obtained from the processing facilities in the data processing system. When a processing facility encounters a problem and identifies an appropriate resolution to the problem, the processing facility provides this failure information and the associated resolution to the failure to the central server. This failure information and associated resolution information is input into a database that is maintained at the central server. Priority pruning rules in block 412 comprise weighting attributes for each failure characteristic encountered with a product. A characteristic may be weighted or prioritized based on its ability to indicate a unique failure mode. Weighting or prioritizing characteristics allows the results of the selective pruning activities to be controlled and optimized around the most useful failure characteristics as defined by users. For example, while the Test Step failure characteristic for a particular software code may currently be a critical failure factor and thus is assigned a high priority weight, the Test Step characteristic for a new software code installed on a certain date may not be an important factor and is assigned a lower priority weight. The priority weights for a characteristic may also be changed in real-time.

In an optional embodiment, operator comments may be collected when a failure has been resolved. The self-optimizing algorithm may include logic (block 413) that mines the operator comments to locate similar words and rank the corrective actions found by the query based on the content of the comments. This ranking may be included as part of the list of recommended corrective actions or may be provided to the operator as a separate "comments-driven" list for review.

If the algorithm does not locate any historic failure symptom characteristics that match the current failure symptom characteristics, the self-optimizing algorithm may prune the least weighted or prioritized failure characteristic from the failure symptom selection criteria and search the historical failure data again. This searching and pruning process continues until a significant match of historical failures is found or an exhaustive search has been completed. When a significant number of failure symptom matches have been found, the self-optimizing algorithm identifies the set of corrective action decisions (i.e., relevant corrective actions) associated with the sorted failure symptom matches. The self-optimizing algorithm sorts the identified corrective action records prior to providing the result set to the operator. The self-optimizing algorithm may use any known sorting or prioritizing criteria to sort the corrective actions in the result set. In one embodiment, the self-optimizing algorithm may sort the corrective action records based on the number of times the corrective action is found in the result set. Thus, the more often a corrective action is performed (i.e., most common actions taken), the higher the corrective action is placed in the result set. The self-optimizing algorithm may also sort or prioritize the corrective actions in the result set to place the most recent records first in the list. For example, the self-optimizing algorithm may sort the corrective action records by date or weighted age of the corrective actions, wherein the most recent corrective action records are listed first in the result set. In one embodiment, the sorting process may comprise having the algorithm selectively prune the corrective action records on a secondary basis by date range. For example, if the algorithm identifies 100 matching failure records but the maximum record requirement specified in the minimum/maximum control table is 10, the algorithm selectively prunes the matching failure records by starting at the current date and time and moving backward in time to identify the first 10 matching failure records based on date of occurrence. Thus, the algorithm prunes the matching failure records to locate the 10 most recent actions taken to fix the problem to form a desired result set, and the most recent corrective actions associated with the failure symptoms are shown first in the result set to be provided to the operator. In another embodiment, the sorting process may comprise having the algorithm weight the matching failure records based on the age of each record, wherein the more recent a matching failure record, the higher the weight given to the record. The weight given to a matching failure record may also be defined by the number of attributes within a record that matches the current failure symptoms. The algorithm sorts the weighted matching failure records in the result set, and the most recent corrective actions associated with the failure symptoms in the result set are placed first in the result set to be provided to the operator.

Once the records are prioritized with most recent records listed first, the self-optimizing algorithm provides the sorted list of relevant corrective actions to the operator at the processing facility (block 414).

At the processing facility, the operator receives the list of corrective action recommendations and performs one or more of the recommended corrective actions to resolve the failure (block 416). The operator may log the corrective actions taken and indicate which one of the actions actually resolved the problem (block 418). The log information is provided to the historical failure database at the central server in block 408 to enable the self-optimizing algorithm to automatically adjust its corrective action recommendations to this new data in real-time for subsequent failures encountered.

Figure 5:
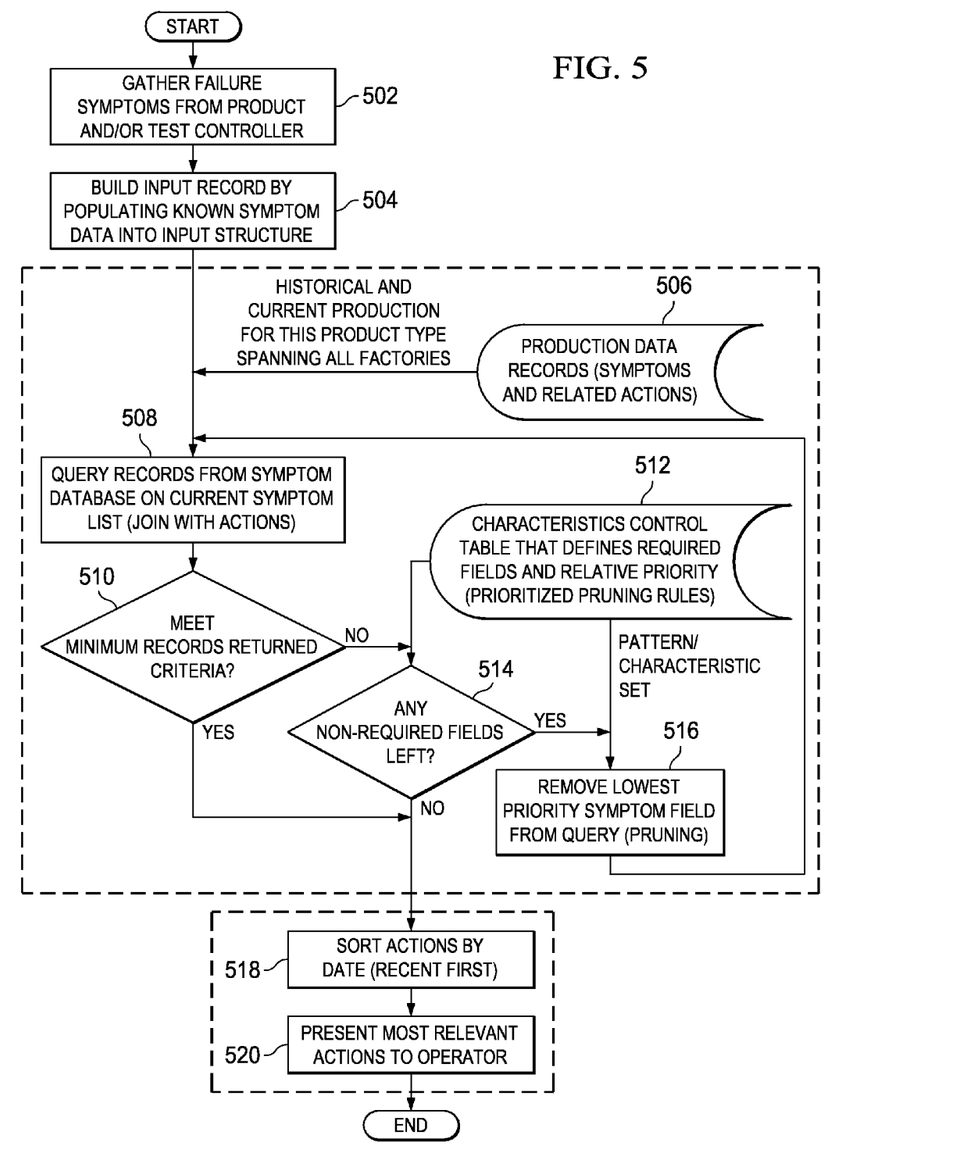
FIG. 5 is a detailed process flow for real-time problem resolution using historical data in accordance with the illustrative embodiments.

FIG. 5 is a detailed process flow for real-time problem resolution using historical data in accordance with the illustrative embodiments. The process described in FIG. 5 is implemented at central server 310 in FIG. 3 and provides a detailed description of the self-optimizing algorithm in blocks 410 and 414 in FIG. 4. Blocks 506-516 represent the failure characteristics search and auto pruning processes, while blocks 518-520 represent the prioritizing and sorting processes in accordance with the illustrative embodiments.

The process begins with the central server gathering failure symptom characteristics from the product test and/or the test controller at one of the processing facilities (block 502). The central server creates a record in an input structure and populates the record with the gathered symptom data (block 504). The input structure is a data structure that is used to associate the data characteristics received from the failing product to the database fields that will be queried to locate matches.

Upon generating the input record, the central server initiates the self-optimizing algorithm for real-time problem resolution. The self-optimizing algorithm accesses production data records in the historical database (block 506) comprising historical production data obtained from all of the processing facilities. The historical database may include failure symptom table illustrated in FIG. 6 and corrective action table illustrated in FIG. 7. Each historical record in the failure symptom table is joined with a corresponding record in the corrective action table that specifies the historic corrective action associated with a failure symptom. Using the failure symptom characteristics gathered from the processing facility as search criteria, the self-optimizing algorithm queries the records in the failure symptom table to locate historical failure data (and the associated corrective actions) matching the search criteria (block 508).

Within block 508, the self-optimizing algorithm may also optionally interface with current inventory information to determine whether or not a replacement part specified in a corrective action is actually on-hand in the inventory stock. The inventory information may include current quality holds or stop shipment data feeds. By examining the current inventory for the suggested replacement parts, the operator may be informed as to which replacement part recommendations are possible based on available inventory stock. When the recommendations are presented to the operator, the recommended actions may be sorted by the current availability of the replacement parts in inventory.

Figure 9:
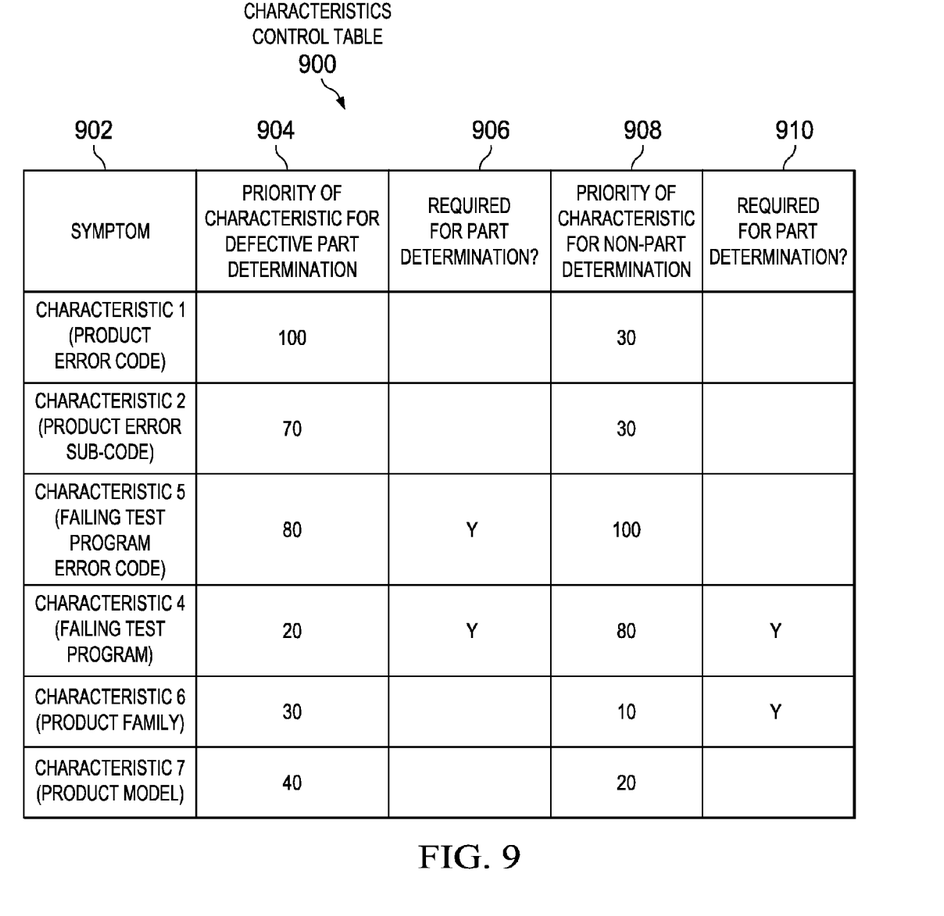
FIG. 9 is an exemplary enhanced Characteristics Control table in accordance with the illustrative embodiments.

A determination is then made by the self-optimizing algorithm as to whether the number of returned matching failure records meets minimum and maximum match threshold criteria (block 510). The minimum and maximum thresholds specify the range of matching records that are deemed by the user to comprise a "significant" match. The minimum and maximum thresholds are user-defined levels that may be hard coded into an application or in a table. An example of a minimum/maximum control table is illustrated in FIG. 9. If the number of returned matching failure records meets a minimum and maximum threshold criteria ('yes' output of block 510), the self-optimizing algorithm sorts the matching failure records (block 518) using any method which prioritizes the corrective actions in the result set to place the most recent records first. As described above, the self-optimizing algorithm may sort or prioritize corrective action records by how often a corrective action is listed in the result set, the date of the corrective action, or the weighted age of the corrective action. Once a desired result set of failure symptoms has been sorted by the self-optimizing algorithm, the algorithm sorts the set of corrective action decisions associated with the sorted failure symptom matches and then provides this sorted list of corrective action recommendations for the failure symptom to the operator at the processing facility (block 520).

Figure 8:
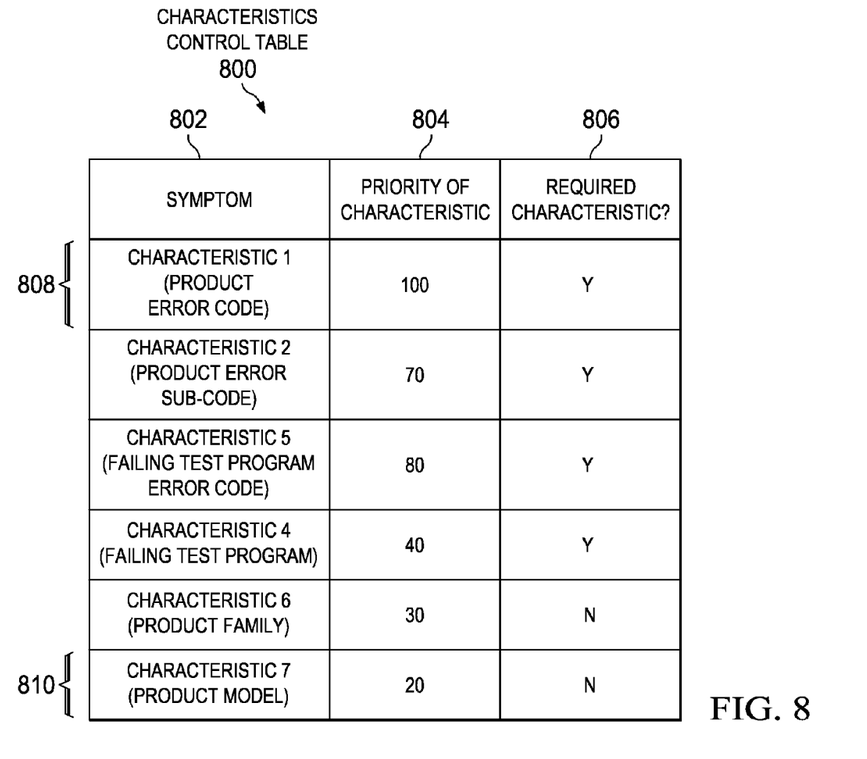
FIG. 8 is an exemplary Characteristics Control table in accordance with the illustrative embodiments.

Turning back to block 510, if the number of returned matching failure records does not meet the minimum and maximum threshold criteria ('no' output of block 510), the self-optimizing algorithm accesses priority rules records in the characteristics control table (block 512) to determine if there are any non-required fields remaining in the search criteria (block 514). A required field is a field in the failure symptom table that has been designated as required to be part of the search criteria. Only matches that include characteristics from these required fields are provided to the operator. Required fields are user-defined fields that may be hard coded into the characteristics control table as shown in FIG. 8. The characteristics control table defines the required characteristic fields and the relative priority/weight of each failure symptom. The self-optimizing algorithm uses the priorities/ weights as pruning rules to determine the next failure symptom characteristic to remove from the search criteria.

If only required fields remain in the search criteria ('no' output of block 514), the algorithm continues to block 518 to sort the failure symptom records. However, if non-required fields remain in the search criteria ('yes' output of block 514), the self-optimizing algorithm prunes the search criteria by removing the failure symptom characteristic from the search criteria that has the lowest designated priority or weight (block 516). By pruning the search criteria in this manner, the self-optimizing algorithm starts with a narrow search of the historical failure data using selection criteria that comprises all of the characteristics in the detected failure symptom, and then widens the query by removing characteristics fields from the search criteria until a significant match is found. The algorithm continues to block 508 to query the historical failure data again with the updated search criteria. The searching and pruning process continues until a significant match of historical failures is found in block 508 or an exhaustive search has been completed in block 514.

Figure 6:
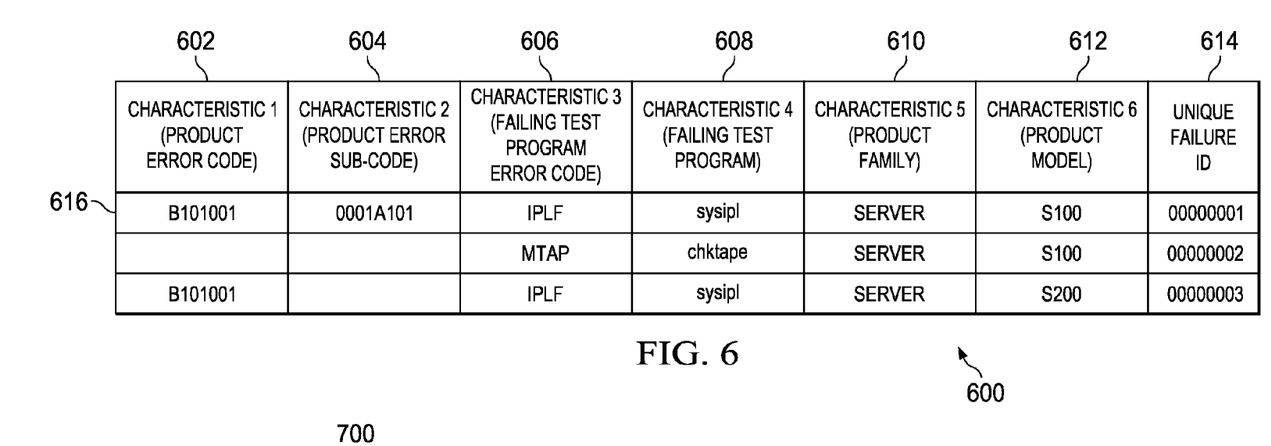
FIG. 6 is an exemplary Failure Symptom table in accordance with the illustrative embodiments.

FIG. 6 is an exemplary failure symptom table in accordance with the illustrative embodiments. Failure symptom table 600 is an example of failure symptom table 508 in FIG. 5. Failure symptom table 600 comprises various records of historical failure symptoms that are obtained from product or test controllers at manufacturing facilities in the production system. A record in failure symptom table 600 comprises one or more characteristics about a failure that are identified at the time of the product assembly or test process failure. Examples of failure symptom characteristics include, but are not limited to, product error code(s), process error code(s), process error messages, test step, test program, time to fail (TTF), manufacturing plant, user ID, product family, product model, etc.

In this illustrative example, a record in failure symptom table 600 comprises various failure characteristics fields, including product error code 602, product sub error code 604, failing test program error code 606, failing test program 608, product family 610, and product model 612. While particular failure characteristics are shown in FIG. 6, it should be noted that failure symptom table 600 may comprise any number and combination of failure characteristic fields as needed to track failure symptoms encountered in the production system. Each record (e.g., record 616) in failure symptom table 600 also comprises a unique failure ID 614 which enables the self-optimizing algorithm to link the particular set of failure characteristics to a correction action that resolved the problem.

When characteristics about a detected failure symptom are received from a production facility, the self-optimizing algorithm described in FIGS. 4 and 5 queries the historical records in failure symptom table 600 using the characteristics of the detected failure symptom to locate a match. The search criteria in the query may initially contain all of the failure characteristics in the detected failure symptom in order to locate one or records that contain the same failure characteristics in fields 602-612 as specified in the search criteria. If no matches are found (or the required number significant number of matches are not found), the self-optimizing algorithm may prune one or more characteristics from the search criteria. For example, if the self-optimizing algorithm prunes product model characteristic 612 from the search criteria, the subsequent query will attempt to match the failure characteristics in failure characteristics fields 602-610. The self-optimizing algorithm may continue to query and prune the search criteria until a significant match is found or an exhaustive search has been performed.

Figure 7:
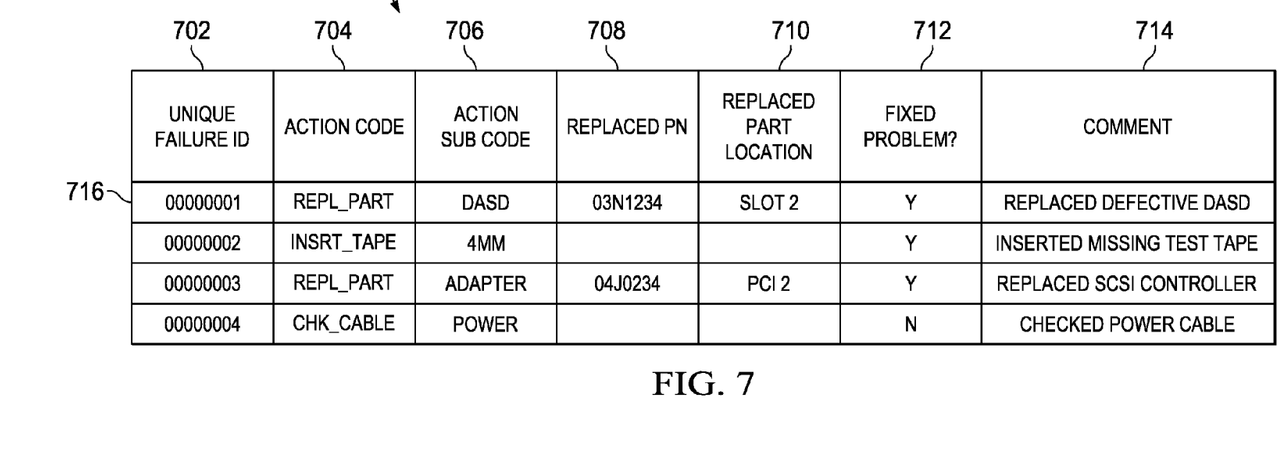
FIG. 7 is an exemplary Corrective Action table in accordance with the illustrative embodiments.

FIG. 7 is an exemplary corrective action table in accordance with the illustrative embodiments. Corrective action table 700 comprises various records of historical corrective actions that were taken and logged at various manufacturing facilities in the production system. A record in corrective action table 700 comprises data about the corrective action that was taken to resolve an associated failure symptom.

In this illustrative example, corrective action table 700 comprises various fields including unique failure ID 702, action code 704, action sub code 706, replaced part number 708, replaced part location 710, fixed problem 712, and comments 714. Unique failure ID 702 is an identifier that links a particular corrective action record to a corresponding failure symptom in failure symptom table 600 in FIG. 6. For instance, unique failure ID '00000001' in record 716 corresponds to record 616 in FIG. 6.

Action code 704 and action sub code 706 specify the particular action taken to resolve the failure. For example, record 716 specifies that the corrective action comprised replacing a defective direct access storage device (DASD). Replaced part number 708 and replaced part location 710 specify the part number used to replace the original part and where the new part was placed, such as the placement of DASD part number '03N1234' in slot 2 in record 716.

Fixed problem 712 specifies whether or not the corrective action taken for the failure symptom actually resolved the problem. The self-optimizing algorithm may look at this field to determine whether or not to provide the corrective action information in a record to the user. For instance, the self-optimizing algorithm may recommend to a user only the corrective actions taken to resolve a failure that actually fix the problem. For instance, even if the failure characteristics in the failure symptom table in FIG. 6 match the search criteria in the query, the self-optimizing algorithm may omit the corrective action information corresponding to the failure characteristics as a recommended fix to the user, since this action taken was not successful.

In an alternative embodiment, however, the self-optimizing algorithm may take advantage of the corrective action data records that have been marked in fixed problem field 712 as known actions that did not correct the problem. In this embodiment, the algorithm may query the most common corrective actions that did not fix this set of failure symptoms and present the results to the operator. The results are presented to the operator as actions the operator should not attempt to perform (as the actions have been unsuccessful in the past) unless the operator has exhausted all of the previously successful recommended actions. The results may be provided separately from the main set of previously successful recommended corrective actions, or highlighted to distinguish these unsuccessful records if provided with the main set of previously successful recommended corrective actions Comments 714 specify additional information about each corrective action. Comments 714 are typically added to a record by the operator who performed the corrective action. The comments may be mined by the self-optimizing algorithm in block 413 of FIG. 4 to locate similar words and rank the corrective actions found by the query and provide this comment information to the operator.

FIG. 8 is an exemplary characteristics control table in accordance with the illustrative embodiments. Characteristics control table 800 is an example of characteristics control table 518 in FIG. 5. Characteristics control table 800 comprises priority pruning rules for each failure symptom characteristic present in failure symptom table 600 in FIG. 6. The priority pruning rules in characteristics control table 800 comprises weighting attributes for each failure symptom characteristic. A characteristic may be weighted or prioritized based on its ability to indicate a unique failure mode. Weighting or prioritizing characteristics allows the results of selectively pruning the query to be controlled and optimized around the most useful failure characteristics as defined by users.

In this illustrative example, characteristics control table 800 comprises a failure symptom field 802, priority of characteristic field 804, and a required characteristic field 806. Failure symptom field 802 specifies a corresponding failure symptom characteristic in the failure symptom table in FIG. 6. For each failure symptom 802, a weight or priority is associated with the failure symptom in priority of characteristic field 804. For example, failure symptom characteristic 'product error code' in record 808 is assigned the highest priority (100) of the failure characteristics, while failure symptom characteristic 'product model' in record 810 has the lowest priority (20) assigned to the failure characteristics in the table. Required characteristic field 806 specifies whether the characteristic is required to be present in the query. Only query matches that include all of the characteristics that are marked as 'required' will be provided to the operator.

In addition, to priority of characteristic field 804 and required characteristic field 806, characteristics control table 800 may include other attributes to be used to control the pruning and match analysis. For example, a factory or site field may be added to characteristics control table 800. The factory or site field may be used to provide more granular control by specifying the failure characteristics from what particular manufacturing facilities to include in the data to be used as part of the pruning and match analysis.

The self-optimizing algorithm uses the values in priority of characteristic field 804 in its pruning analysis to determine which one of the failure symptom characteristics is indicated as least important to finding a resolution to the failure. As failure symptom characteristic 'product model' in record 810 is assigned the lowest priority (20) of the failure characteristics, this characteristic will be the first characteristic that is removed from the query in the pruning process. The self-optimizing algorithm will continue to automatically prune the query characteristic by characteristic until a significant match is found or until the search has been exhausted. A search may be exhausted if the next available characteristic for pruning is marked as a required characteristic in required characteristic field 806; thus the query may not be pruned further. Since only query matches that include all of the characteristics that are marked as 'required' will be provided to the operator, the self-optimizing algorithm may end the search process if no significant matches are found and the only available characteristics for pruning are marked as required fields. The self-optimizing algorithm may then return any matches found (even though the number of matches does not meet the required minimum and maximum threshold criteria in FIG. 10) to the operator.

FIG. 9 is an exemplary enhanced characteristics control table in accordance with the illustrative embodiments Like characteristics control table 800 in FIG. 8, characteristics control table 900 comprises weighting attributes for each failure symptom characteristic present in failure symptom table 600 in FIG. 6. However, FIG. 9 illustrates an example of how characteristics control table 900 may be expanded to contain multiple levels of optimization criteria to enable the self-optimizing algorithm to provide independent categories of corrective action recommendations. For example, for hardware failures and process (operator) problems that cause the same failure symptoms, the self-optimizing algorithm may display the most likely hardware failures separately from the most likely operator/process problems.

In this example, characteristics control table 900 specifies weighting attributes for the identification of a defective product and weighting attributes for the identification of process or environmental problems. Multiple criteria are used by the self-optimizing algorithm to provide different sets of recommendations to the operator. For instance, for each failure symptom 902, priority characteristic for defective part determination 904 and required for part determination 906 fields are used for optimizing the query to identify a failed product and its associated corrective action. Priority characteristic for non-part determination 908 and required for non-part determination 910 fields are used for optimizing the query to identify a process or environmental problem. A process or environmental problem is a problem not based on the failure of a part, such as an operator error.

Using characteristics control table 900, the self-optimizing algorithm generates two separate corrective action recommendations to the operator. One of the recommendations is based on the optimization on the most likely failing part, while the other recommendation is based on the most likely non-part (process) issue that cause the failure symptoms. The self-optimizing will execute twice (once for the part optimization and once for the non-part optimization) to generate the separate corrective action recommendations to the operator.

Figure 10:
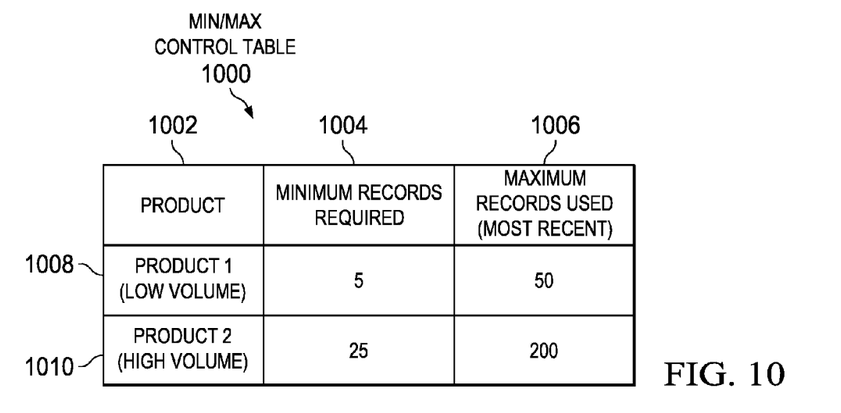
FIG. 10 is an exemplary Minimum/Maximum table in accordance with the illustrative embodiments.

FIG. 10 is an exemplary Minimum/Maximum table in accordance with the illustrative embodiments. Minimum/Maximum table 1000 comprises user-defined criteria that specifies, for a product, the acceptable range of matching records that must be returned by the self-optimizing algorithm in the list of corrective action recommendations to be considered by the user a "significant" match.

In this illustrative example, Minimum/Maximum table 1000 comprises, for each product 1002, a minimum records required field 1004 and maximum records used field 1006. Record 1008 represents a low volume product, and record 1010 represents a high volume product. Minimum records required field 1004 specifies, in example record 1008, that recommendations are returned to the operator if at least 5 records are found from the query, and that no more than 50 of the sorted records are included in the list of recommendations. Larger minimum and maximum values are used in record 1010 as the product is a high volume product. Consequently, a larger number of records may be provided to the operator to allow offer more data to the operator on which the operator may determine the appropriate corrective action for the detected failure.

Figure 11:
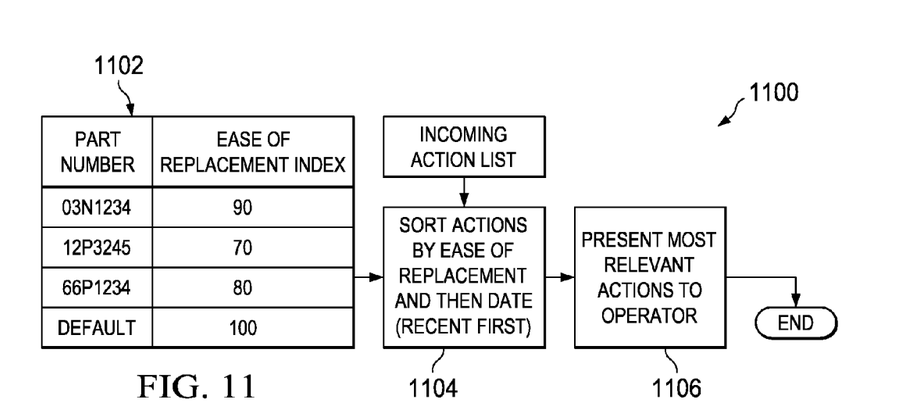
FIG. 11 is a process flow illustrating prioritization of problem resolution results based on ease of part replacement in accordance with the illustrative embodiments.

FIG. 11 is a process flow illustrating prioritization of problem resolution results based on ease of part replacement in accordance with the illustrative embodiments. Ease of replacement table 1102 in FIG. 11 comprises additional criteria that may be used to prioritize the corrective action recommendations to be provided to an operator based on a consideration of the difficulty of replacing parts identified by the sorting algorithm. Ease of replacement specifies the level of ease in which a failed part may be replaced or verified by the operator. If the operator is trained to follow recommended corrective actions in order, the ease of replacement index may direct the operator to try the easily-performed and verified corrective actions first before attempting to perform the time-consuming ones. An easy corrective solution may comprise a corrective action that takes minimal amount of time for the operator to complete, while a difficult corrective solution may comprise a corrective action that requires the operator to take apart and then rebuild most of the product to access the part to be replaced. Using the additional ease of replacement criteria takes into consideration impending production deadlines (e.g., end of quarter) and highlights the corrective action that may be performed within the deadline. Intelligence may be added to the self-optimizing algorithm to enable the algorithm to determine the remaining time before the deadline, such as the shipment/end of day/month/quarter. The corrective actions that may be performed under the deadline may be highlighted (e.g., in a special color or using a special indicator) so that the operator will know to attempt these corrective actions first. Consequently, the operator may choose to try the "easier" actions first that may potentially allow the product to be fixed and completed under the required deadline.

Ease of replacement table 1102 specifies the part number and a value indicating the ease of replacement. In this example, the ease of replacement value comprises an index value for the corresponding part number, where part number 03N1234 has a value of 90 which indicates the part number is easier to replace than part number 12P3245 which has a value of 70. Other part numbers which do not have a particular ease of replacement value specified may default to either the hardest of easier value. Ease of replacement table 1102 may also be extended to include replacement part cycle times instead of arbitrary index values for the part.

The process in FIG. 11 may be implemented within blocks 512 and 514 in FIG. 5. For example, upon receiving a list of recommendations returned from the query, the ease of replacement index in ease of replacement table 1102 is used to sort the recommended corrective actions in order of difficulty from easiest to hardest and then on the date performed, with the most recent action performed listed first 1104. These sorted recommendations are then provided to the operator 1106.

In another embodiment, further additional criteria may be used to limit the corrective action recommendations to be provided to an operator based on skill level of the operator. A skill level table may be maintained which comprises a minimum skill level, rank, or certification that is required to replace or fix the failed part. If the current operator is not authorized to perform that replacement, the self-optimizing algorithm may not include that particular corrective action to the operator. Alternatively, the self-optimizing algorithm may highlight or display that particular corrective action in such a manner as to notify the operator of the need for additional skill or certification.

The following particular data examples describe how aspects of the illustrative embodiments may identify in real-time previous corrective actions taken for similar symptoms detected across processing facilities at other locations and providing corrective action recommendations based on historical failure data to an end user. In a first instance, a product failure occurs on Jan. 10, 2007 with the following characteristics: "Product=Workstation" "Process_Return=IPL_PHASE2" and "Step=A100". The selection and auto-prune algorithm is invoked to find "like" symptoms and corresponding corrective actions. The algorithm finds only one match to all the characteristics in the search criteria. If the minimum records required field in the minimum/maximum control table in FIG. 10 specifies that 3 records are required to comprise a significant match, the query fails the significant test and auto-pruning is required to remove one of the characteristics from the query. The auto-pruning removes the characteristics with the lowest designated priority. In this example, the characteristics Process_Return=IPL_PHASE2 is removed from the query. The selection and auto-prune algorithm is invoked again to find "like" symptoms and corresponding corrective actions. This time, the algorithm finds a sufficient number of records to sort, return, and display to the operator.

On Jan. 20, 2007 (10 days later), another failure occurs with the same characteristics: "Product=Workstation" "Process_Return=IPL_PHASE2" and "Step=A100". The selection and auto-prune algorithm is invoked to find "like" symptoms and corresponding corrective actions, and the algorithm finds only one match to all the characteristics in the search criteria. Since the minimum records required field in the minimum/maximum control table in FIG. 10 specifies that 3 records are required to comprise a significant match, the query fails the significant test and auto-pruning is required to remove one of the characteristics from the query. The auto-pruning removes the lowest designated priority characteristic Process_Return=IPL_PHASE2 from the query, and the selection and auto-prune algorithm is invoked again to find "like" symptoms and corresponding corrective actions. This time, the algorithm finds a sufficient number of records to sort, return, and display to the operator. On Jan. 20, 2007, a different failure occurs with the following different characteristics: "Product=Workstation" "Process_Return=IPL_PHASE3" and "Step=A100". The selection and auto-prune algorithm is invoked to find "like" symptoms and corresponding corrective actions, and the algorithm finds five matches to all the characteristics in the search criteria. This number of matches meets the significance test in the minimum/maximum control table in FIG. 10. No auto-pruning is required in this case. Since the algorithm has found a sufficient number of records, the algorithm sorts, returns, and displays the recommended actions to the operator.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for recommending corrective actions for a detected failure in real-time, the computer implemented method comprising:
    responsive to receiving failure symptom characteristics for a product or process failure, querying historical failure data collected in real-time to locate historical failure symptoms matching the failure symptom characteristics using an initial search query;
    identifying historical corrective actions corresponding to the matching historical failure symptoms that resolved the historical failure symptoms;
    determining if a total number of the historical corrective actions identified meets a minimum match threshold;
    responsive to a determination that the total number of historical corrective actions identified does not meet the minimum match threshold, selectively pruning a failure symptom characteristic having the lowest priority level from the initial search query to form an adjusted search query;
    repeating the querying, identifying, and determining steps using the adjusted search query until the total number of historical corrective actions identified meets the minimum match threshold;
    responsive to a determination that the number of historical corrective actions identified meets the minimum threshold, sorting the historical corrective actions to form a list of recommended corrective actions for the failure symptom characteristics; and
    providing the list of recommended corrective actions to an end user.

2. The computer implemented method of claim 1, further comprising:
    responsive to the end user performing one or more corrective actions from the list of recommended corrective actions, receiving a log from the end user indicating the corrective action taken by the end user that resolved the product or process failure.

3. The computer implemented method of claim 1, wherein the historical failure data is obtained from a plurality of manufacturing facilities in a manufacturing environment.

4. The computer implemented method of claim 1, wherein a priority level indicates a failure mode uniqueness of an associated failure symptom characteristic.

5. The computer implemented method of claim 1, wherein the list of recommended corrective actions comprises an indicator that indicates to the end user a level of ease of performing a corrective action.

6. The computer implemented method of claim 1, wherein changing priority levels of the failure symptom characteristics automatically changes the historical corrective actions to be provided to the end user for the failure symptom characteristics.

7. The computer implemented method of claim 1, wherein corrective actions associated with a product failure are presented in the list of recommended corrective actions separately from corrective actions associated with a process failure.

8. The computer implemented method of claim 1, further comprising:
    alerting the end user to a known process or infrastructure problem by associating the known process or infrastructure problem with a failure symptom characteristic caused by the known process or infrastructure problem.

9. The computer implemented method of claim 1, further comprising:
    determining if a corrective action replacement part specified in the list of recommended corrective actions is available in current inventory stock; and
    suggesting corrective actions to the end user by highlighting corrective actions having corrective action replacement parts available in current inventory stock in the list of recommended corrective actions.

10. The computer implemented method of claim 1, further comprising:
    responsive to a determination that the end user does not comprise a skill level required to perform a particular corrective action in the list of recommended actions, omitting the particular corrective action in the list of recommended actions provided to the end user.

11. The computer implemented method of claim 1, wherein querying historical failure data to locate historical failure symptoms matching the failure symptom characteristics further comprises:
    data mining end user comments to identify failure symptom characteristics, wherein the end user comments are collected when a product or process failure is resolved; and
    using the failure symptom characteristics identified from the end user comments to query the historical failure data to locate historical failure symptoms matching the failure symptom characteristics.

12. The computer implemented method of claim 1, wherein sorting the historical corrective actions further comprises prioritizing the historical corrective actions based on how often a historical corrective action is present in the total number of historical corrective actions identified.

13. The computer implemented method of claim 1, wherein sorting the historical corrective actions further comprises prioritizing the historical corrective actions based on a date of each historical corrective actions in the total number of historical corrective actions identified.

14. The computer implemented method of claim 1, wherein sorting the historical corrective actions further comprises:
  weighting each historical corrective action in the total number of historical corrective actions identified according to an age of each historical corrective action; and
  prioritizing the historical corrective actions based on a weighted age assigned to each historical corrective action in the total number of historical corrective actions.

15. A computer program product for recommending corrective actions for a detected failure in real-time, the computer program product comprising:
  a computer usable storage medium having computer usable program code tangibly embodied thereon, the computer usable program code comprising:
  computer usable program code for querying, in response to receiving failure symptom characteristics for a product or process failure, historical failure data collected in real-time to locate historical failure symptoms matching the failure symptom characteristics using an initial search query;
  computer usable program code for identifying historical corrective actions corresponding to the matching historical failure symptoms that resolved the historical failure symptoms;
  computer usable program code for determining if a total number of the historical corrective actions identified meets a minimum match threshold;
  computer usable program code for selectively pruning a failure symptom characteristic having the lowest priority level from the initial search query to form an adjusted search query in response to a determination that the total number of historical corrective actions identified does not meet the minimum match threshold;
  computer usable program code for repeating the querying, identifying, and determining steps using the adjusted search query until the total number of historical corrective actions identified meets the minimum match threshold;
  computer usable program code for sorting the historical corrective actions to form a list of recommended corrective actions for the failure symptom characteristics in response to a determination that the number of historical corrective actions identified meets the minimum threshold; and
  computer usable program code for providing the list of recommended corrective Actions to an end user.

16. The computer program product of claim 15, further comprising:
  computer usable program code for receiving, in response to the end user performing one or more corrective actions from the list of recommended corrective actions, a log from the end user indicating the corrective action taken by the end user that resolved the product or process failure.

17. The computer program product of claim 15, wherein the historical failure data is obtained from a plurality of manufacturing facilities in a manufacturing environment.

18. The computer program product of claim 15, wherein the list of recommended corrective actions comprises an indicator that indicates to the end user a level of ease of performing a corrective action.

19. The computer program product of claim 15, wherein the computer usable program code for changing priority levels of the failure symptom characteristics automatically changes the historical corrective actions to be provided to the end user for the failure symptom characteristics.

20. A data processing system for recommending corrective actions for a detected failure in real-time, the data processing system comprising:
  a bus;
  a storage device connected to the bus, wherein the storage device contains computer usable code;
  at least one managed device connected to the bus;
  a communications unit connected to the bus; and
  a processing unit connected to the bus, wherein the processing unit executes the computer usable code to query, in response to receiving failure symptom characteristics for a product or process failure, historical failure data collected in real-time to locate historical failure symptoms matching the failure symptom characteristics using an initial search query; identify historical corrective actions corresponding to the matching historical failure symptoms that resolved the historical failure symptoms; determine if a total number of the historical corrective actions identified meets a minimum match threshold; selectively prune a failure symptom characteristic having the lowest priority level from the initial search query to form an adjusted search query in response to a determination that the total number of historical corrective actions identified does not meet the minimum match threshold; repeat the computer usable code for querying, identifying, and determining using the adjusted search query until the total number of historical corrective actions identified meets the minimum match threshold; sort the historical corrective actions to form a list of recommended corrective actions for the failure symptom characteristics in response to a determination that the number of historical corrective actions identified meets the minimum threshold; and provide the list of recommended corrective actions to an end user.

* * * * *